(12) United States Patent
Toida (10) Patent No.: US 8,021,540 B2
(45) Date of Patent: Sep. 20, 2011

(54) METHOD OF DESULFURIZING HYDROCARBON OIL

(75) Inventor: Yasuhiro Toida, Toda (JP)

(73) Assignee: Japan Energy Corporation, Tokyo (JP)

( * ) Notice: Subject to any disclaimer, the term of this patent is extended or adjusted under 35 U.S.C. 154(b) by 1078 days.

(21) Appl. No.: 10/586,606

(22) PCT Filed: Jan. 27, 2005

(86) PCT No.: PCT/JP2005/001065
§ 371 (c)(1),
(2), (4) Date: Jul. 19, 2006

(87) PCT Pub. No.: WO2005/073348
PCT Pub. Date: Aug. 11, 2005

(65) Prior Publication Data
US 2009/0000990 A1    Jan. 1, 2009

(30) Foreign Application Priority Data

Feb. 2, 2004   (JP) .................................. 2004-025047
Sep. 16, 2004  (JP) .................................. 2004-269391

(51) Int. Cl.
*C10G 29/06*   (2006.01)
*C10G 29/16*   (2006.01)

(52) U.S. Cl. ........ 208/250; 208/219; 208/248; 208/249; 208/299

(58) Field of Classification Search .................. 208/219, 208/245, 246, 248, 250, 299
See application file for complete search history.

(56) References Cited

U.S. PATENT DOCUMENTS

| | | | |
|---|---|---|---|
| 5,935,422 A | 8/1999 | Zinnen | |
| 2002/0179498 A1 | 12/2002 | Chester et al. | |
| 2005/0173297 A1 * | 8/2005 | Toida ............................. | 208/14 |

FOREIGN PATENT DOCUMENTS

| | | |
|---|---|---|
| EP | 1 142 636 | 10/2001 |
| JP | 2-132186 | 5/1990 |
| JP | 6-154615 | 6/1994 |
| JP | 2000-154388 | 6/2000 |
| JP | 2000-234093 | 8/2000 |
| JP | 2001-64214 | 3/2001 |
| JP | 2001-279257 | 10/2001 |
| JP | 2003-49172 | 2/2003 |
| JP | 2003-268386 | 9/2003 |
| JP | 2003-299959 | 10/2003 |
| WO | WO 02/18517 | 3/2002 |
| WO | 03/020850 | 3/2003 |
| WO | WO 03/097771 | * 11/2003 |

OTHER PUBLICATIONS

Fukunaga, T. et al, "Development of kerosene fuel processing system for PEFC", Catalysis Today 84(2003) 197-200, Jul. 2003.*
European Patent Office issued an European Search Report dated Apr. 9, 2010, Application No. 05709370.0.

* cited by examiner

*Primary Examiner* — Walter Griffin
*Assistant Examiner* — Renee E Robinson
(74) *Attorney, Agent, or Firm* — Young & Thompson (57) ABSTRACT

A method of desulfurizing/refining a hydrocarbon oil by which sulfur compounds are diminished to an extremely low concentration at a relatively low equipment cost and operating cost. The method of desulfurizing/refining a hydrocarbon oil comprises bringing a hydrocarbon oil containing at least one sulfur compound selected from the group consisting of thiophene compounds, benzothiophene compounds, and dibenzothiophene compounds and optionally further containing aromatic hydrocarbons into contact with a solid acid catalyst and/or an activated carbon having a transition metal oxide supported thereon to thereby desulfurize the oil. The solid acid catalyst preferably is a solid ultrastrong-acid catalyst selected among sulfuric acid radical/zirconia, sulfuric acid radical/alumina, sulfuric acid radical/tin oxide, sulfuric acid radical/iron oxide, tungstic acid/zirconia, and tungstic acid/tin oxide.

16 Claims, 1 Drawing Sheet

Fig. 1

METHOD OF DESULFURIZING HYDROCARBON OIL

TECHNICAL FIELD

The present invention relates to a method for desulfurizing hydrocarbon oils, in particular, aromatic hydrocarbon oils such as benzene, toluene, xylene, naphthalene, methylnaphthalene, and dimethylnaphthalene, hydrocarbon oils containing these aromatic hydrocarbons, kerosene, gas oil and the like.

BACKGROUND ART

Aromatic hydrocarbons such as benzene and naphthalene can be obtained by separating from petroleum and coal tar. These aromatic hydrocarbons contain sulfur compounds as impurities. These aromatic hydrocarbons are used as basic raw materials for various petrochemicals or intermediate materials. When these products or intermediate materials are manufactured, sulfur compounds may act as a catalyst poison. Therefore, in many cases, the aromatic hydrocarbons must be desulfurized to a sulfur content of 1 ppm or less, preferably 0.5 ppm or less, and more preferably 0.1 ppm or less. However, because sulfur compounds contained in these aromatic hydrocarbons are aromatic sulfur compounds such as thiophenes, benzothiophenes, and dibenzothiophenes having boiling points and properties similar to the aromatic hydrocarbons, it is not easy to precisely separate them by distillation.

A method for removing the sulfur compounds by adsorption using a physical adsorbent without a reaction has been studied (Patent Document 1). However, removing sulfur compounds in hydrocarbon oils with a high aromatic hydrocarbon content by adsorption is not easy, particularly when the content of the sulfur compound is low. A method for removing the sulfur compounds as sulfur by chemisorption using a sorbent accompanying a reaction has also been researched (Patent Document 2). However, the document refers to investigation of desulfurization of naphtha with a low aromatic content and does not refer to thiophenes, benzothiophenes, and dibenzothiophenes. The desulfurization reaction in hydrorefining not only requires a high operating cost and high equipment cost due to the reaction using hydrogen at a high temperature under high pressure, but also contains problem of impurities produced due to hydrogenation or decomposition of aromatic hydrocarbons themselves. Production of impurities is significant particularly when the content of sulfur compounds is small. Oxidation desulfurization using an oxidizer requires complicated equipment, a high operating cost and equipment cost due to need for phase separation in addition to the use of an oxidizer such as hydrogen peroxide and an acid catalyst. A method for removing sulfur compounds by homopolymerization or decomposition by adding anhydrous aluminum chloride is also known (Patent Documents 3 and 4). The method has problems that not only the use of anhydrous aluminum chloride requires a high operating cost and equipment cost, but also the rate of desulfurization is low due to the low rate of homopolymerization or decomposition.

[Patent Document 1] Japanese Patent Application No. 2003-77594

[Patent Document 2] Japanese Patent Application Laid-open No. 2-132186

[Patent Document 3] Japanese Patent Publication No. 4747021

[Patent Document 4] Japanese Patent Application Laid-open No. 63-57539

DISCLOSURE OF THE INVENTION

Problems to be Resolved by The Invention

An object of the present invention is to provide a method for reducing sulfur compounds to an extremely low concentration at a relatively low equipment cost and operating cost.

Means for Solving the Problems

As a result of extensive studies to solve the above-mentioned problems, the inventor has achieved the present invention in which organic sulfur compounds can be efficiently removed particularly to a sulfur content of 1 ppm or less. Specifically, the present invention provides a method for desulfurizing hydrocarbon oils comprising causing a hydrocarbon oil containing at least one sulfur compound selected from the group consisting of thiophene compounds, benzothiophene compounds, and dibenzothiophene compounds or a hydrocarbon oil further containing aromatic hydrocarbons to come in contact with a solid acid catalyst and/or activated carbon containing a transition metal oxide.

In this desulfurization method, sulfur compounds contained in the hydrocarbon oil are preferably reacted among themselves and/or with aromatic hydrocarbons by causing the hydrocarbon oil to come in contact with the solid acid catalyst.

In addition, the sulfur compounds in the hydrocarbon oil and heavy sulfur compounds produced by the reaction among the sulfur compounds contained in the hydrocarbon oil and/or by the reaction of the sulfur compounds with aromatic hydrocarbons are preferably desulfurized by adsorption using a solid acid catalyst and/or activated carbon containing a transition metal oxide, in particular, to 1 ppm or less of the total sulfur content in the hydrocarbon oil.

The solid acid catalyst used in the desulfurization method for hydrocarbon oil of the present invention preferably comprises zeolite selected from the group consisting of a proton-type faujasite zeolite, proton-type mordenite, and proton-type β-zeolite. These zeolites more preferably have a silica/alumina ratio of 100 mol/mol or less and a content of cations other than protons contained therein is preferably 5 mass % or less.

The solid acid catalyst is preferably a solid superacid catalyst selected from the group consisting of sulfated zirconia, sulfated alumina, sulfated tin oxide, sulfated iron oxide, tungstated zirconia, and tungstated tin oxide, more preferably having a specific surface area of 100 $m^2/g$ or more.

The transition metal oxide supported on the activated carbon used in the desulfurization method for hydrocarbon oil of the present invention is preferably copper oxide.

In the desulfurization method of the present invention, the hydrocarbon oil preferably contains aromatic hydrocarbons as the main component. The aromatic hydrocarbons are preferably at least one aromatic hydrocarbon selected from the group consisting of benzene, alkylbenzenes having 7-14 carbon atoms, naphthalene, and alkylnaphthalenes having 11-18 carbon atoms. The advantage of the present invention can be given most effectively for the hydrocarbon oil containing those aromatic hydrocarbons.

The desulfurization method of the present invention can also be suitably applied to hydrocarbon oils such as kerosene and gas oil. In particular, the desulfurization method of the present invention can be suitably used for desulfurizing kerosene or gas oil in fuel cell vehicles in which kerosene or gas oil is used as an on-board reforming fuel.

The present invention further provides a fuel cell system comprising desulfurizing kerosene with dibenzothiophenes content of 0.1 ppm or less (as sulfur) using the above desulfurization method, supplying the kerosene to the fuel cell system, and generating hydrogen for fuel cell.

Furthermore, the present invention provides kerosene having a sulfur content of 1 ppm or less and a content of thiophenes, benzothiophenes, and dibenzothiophenes in the total sulfur content of 10% or less or kerosene having a content of thiophenes and benzothiophenes in the total sulfur content of 10% or less.

Effects of the Invention

According to the desulfurization method of the present invention, since the solid acid catalyst and/or activated carbon containing a transition metal oxide are used, sulfur compounds in hydrocarbon oils or heavy sulfur compounds produced by the catalytic function of the solid acid catalyst and the like can be removed by adsorption onto the solid acid catalyst and/or activated carbon containing a transition metal oxide. Therefore, even sulfur compounds in aromatic hydrocarbon oils can be efficiently and economically removed. As a result, the present invention can provide kerosene, gas oil, and hydrocarbon oils containing aromatic hydrocarbons such as benzene and naphthalene with particularly small sulfur content. In addition, in the desulfurization method of the present invention the molecular weight increase of the sulfur compounds does not depend on alkylation of the sulfur compounds. The molecular weight of the sulfur compounds can be increased by the reaction among the sulfur compounds and/or the reaction between the sulfur compounds and aromatic hydrocarbons without using a special alkylating agent such as olefins.

BEST MODE FOR CARRYING OUT THE INVENTION

In the desulfurization method of the present invention, sulfur compounds contained in hydrocarbon oils, particularly hydrocarbon oils containing aromatic hydrocarbons can be efficiently removed by a solid acid catalyst or an activated carbon containing a transition metal oxide.

As examples of the hydrocarbon oil suitably used in the desulfurization method of the present invention, aromatic hydrocarbons containing benzene, alkylbenzenes having 7-14 carbon atoms such as toluene and xylene, naphthalene, and alkylnaphthalenes having 11-18 carbon atoms such as methylnaphthalene and dimethylnaphthalene as the main components can be given. Particularly preferable aromatic hydrocarbons are those containing benzene, toluene, xylene, naphthalene, methylnaphthalene, dimethylnaphtalene, and the like as the main components. The content of aromatic hydrocarbons is preferably 60 mass % or more, and more preferably 80 mass % or more. The method of the present invention can also be applied to aromatic hydrocarbon fractions before isolation of benzene, toluene, xylene, and the like by precise fractionation.

Furthermore, the desulferization method of the present invention can be applied to desulfurization of paraffin hydrocarbons such as decane, kerosene, and gas oil. When using hydrocarbons as a source of hydrogen for fuel cells and the like, sulfur contained in the hydrocarbon must be severely removed, since sulfur is a catalyst poison of reforming catalysts in hydrogen production processes. The desulfurization method of the present invention can be suitably used particularly when kerosene or gas oil is used as an on-board reforming fuel for fuel cell vehicles, since if kerosene having dibenzothiophenes, which are compounds very difficult to remove, in a concentration of 0.1 ppm or less (as sulfur) is used, the desulfurization can be carried out more easily by the method of the present invention. Therefore, if the desulfurization method of the present invention is applied to a fuel cell system, it is possible to produce hydrogen from kerosene with a small dibenzothiophene concentration without poisoning a reforming catalyst for hydrogen production and to supply the hydrogen to the fuel cell. The fuel cell system incorporating the desulfurization method of the present invention may be either a stationary type or a mobile type (for example, a fuel cell vehicle, etc.).

Kerosene is oil that contains hydrocarbons with 12-16 carbon atoms as main components and has a density of 0.790 to 0.850 g/cm$^3$ at 15° C. and boiling point range of 150 to 320° C. Kerosene comprises a large amount of paraffin hydrocarbons, about 0-30 vol % of aromatic hydrocarbons and about 0-5 vol % of polycyclic aromatic hydrocarbons. Generally, kerosene means JIS No. 1 kerosene defined in JIS K2203 as lighting kerosene, heating oil, and cooking fuel. Properties provided in JIS K2203 include a flash point of 40° C. or higher, 95% distillation temperature of 270° C. or lower, sulfur content of 0.008 mass % or less, smoke point of 23 mm or more (21 mm or more for kerosene for use in cold climate), copper plate corrosion (50° C., 3 hours) of 1 or less, and Saybolt color of +25 or more. Usually, the sulfur content is about several ppm to 80 ppm and the nitrogen content is about several ppm to ten ppm.

Because the desulfurization method of the present invention is more effective for removing thiophenes and benzothiophenes than dibenzothiophenes, the method can be preferably applied to hydrocarbon oils containing a smaller amount of dibenzothiophenes, particularly light kerosene. Dibenzothiophenes have a comparatively high boiling point and, therefore, can be removed by distillation or other known methods.

Gas oil is oil that contains hydrocarbons with 16-20 carbon atoms as main components and has a density of 0.820 to 0.880 g/cm$^3$ at 15° C. and boiling point range of 140 to 390° C. Gas oil comprises a large amount of paraffin hydrocarbons, about 10-30 vol % of aromatic hydrocarbons and about 1-10 vol % of polycyclic aromatic hydrocarbons. Usually, the sulfur content is about several ppm to 100 ppm and the nitrogen content is about several ppm to several tens of ppm.

The solid acid catalyst used in the present invention catalyzes the reaction among the sulfur compounds contained in the hydrocarbon oil and/or the reaction of the sulfur compounds and aromatic hydrocarbons (i.e. a reaction of a thiophene ring and a benzene ring), whereby accelerates formation of heavy sulfur compounds, and functions as an adsorbent to adsorb sulfur compounds in hydrocarbon oil, particularly heavy sulfur compounds formed by the reactions. Incidentally, since the sulfur compounds increase their molecular weight due to the reaction among themselves or the reaction mainly between a thiophene ring and a benzene ring, the molecular weight increase in the present invention differs from the molecular weight increase by alkylation of sulfur compounds contained in naphtha using a solid acid under the presence of an alkylation agent (e.g. olefins), and, therefore, does not specifically require an alkylation agent such as an olefin in the present invention.

As specific examples of the solid acid catalyst, in addition to solid acids such as zeolite, silica alumina, and activated clay, solid superacids such as sulfated zirconia, sulfated alumina, sulfated tin oxide, sulfated iron oxide, tungstated zirconia, tungstated tin oxide and the like can be given. The solid acid catalyst is preferably at least one type of zeolite selected from a proton-type faujasite zeolite, proton-type mordenite, and proton-type β-zeolite. These types of zeolite have a silica/alumina ratio preferably of 100 mol/mol or less, and more preferably 30 mol/mol or less, because the smaller the silica/alumina ratio, the greater the amount of acids acting as adsorption sites.

Zeolite is a generic term of crystalline hydrated aluminosilicate shown by a general formula of $xM_{2/n}O.Al_2O_3.ySiO_2.zH_2O$, wherein n is a valence of cation M, x is a number of 1 or less, y is a number of 2 or more, and z is a number of 0 or more. Zeolite has a regularly arranged three-dimensional structure of tetrahedrons of $SiO_4$ or $AlO_4$ centering Si or Al, respectively. The structure of zeolite is described in detail, for example, in the website (http://www.iza-structure.org/) of the Structure Commission of the International Zeolite Association (IZA). Because the tetrahedron of $AlO_4$ is negatively charged, charge compensation cations such as alkali metal or alkaline earth metal are maintained in the pores or caves. The charge compensation cation can be easily exchanged for another cation such as a proton. Moreover, the molar ratio of $SiO_2/Al_2O_3$ increases by an acid treatment or the like, resulting in an increase of the acid strength and decrease of the solid acid amount. It is preferable not to reduce the solid acid amount, since the acid strength does not affect adsorption of sulfur compounds so much.

The units forming the skeleton structure of Faujasite-type zeolite (FAU) are a four-membered ring structure, six-membered ring structure, and six-membered double rings structure. The micropore has a three-dimensional structure, with the entrance having a round shape formed of a non-plane 12-membered ring structure, and the crystal system is cubic. Faujasite, which is a faujasite-type natural zeolite, is represented by the molecular formula $(Na_2, Ca, Mg)_{29}.Al_{58}Si_{134}O_{384}.240H_2O$ and the like and has a micropore diameter of 7.4×7.4 Å and a unit cell size of 24.74 Å. There are X-type and Y-type as faujasite-type synthetic zeolites. NaX-type zeolite is shown by the formula $Na_{88}[(AlO_2)_{88}SiO_2)_{104}].220H_2O$ or the like and can adsorb molecules with an effective diameter up to about 10 Å. NaY-type zeolite can adsorb molecules with an effective diameter up to about 8 Å. The faujasite-type zeolite which can be preferably used in the present invention is represented by the general formula $xNa_2O.Al_2O_3.ySiO_2$, wherein preferably x<1 and y<100, particularly preferably x<0.1 and y<100, and still more particularly preferably x<0.1 and y<30. The molar ratio of $SiO_2/Al_2O_3$ is preferably 100 mol/mol or less, particularly preferably 30 mol/mol or less, and still more particularly preferably 10 mol/mol or less. The cation content other than protons such as sodium is preferably 5 mass % or less, more preferably 3 mass % or less, and still more preferably 1 mass % or less.

The units forming the skeleton structure of mordenite (MOR) are a four-membered ring structure, five-membered ring structure, and eight-membered ring structure. The micropore has a one-dimensional structure and three-dimensional structure, with the entrance having an oval shape formed of a non-plane 12-membered ring and eight-membered ring, and the crystal system is orthorhombic. Mordenite which is natural zeolite is represented by the formulas $Na_8Al_8Si_{40}O_{96}.24H_2O$ and the like, has two channels, one having a one-dimensional 12-membered ring structure with a micropore diameter of 6.5×7.0 Å and the other having a three-dimensional eight-membered ring structure with a micropore diameter of 2.6×5.7 Å, and both are connected with each other. A unit cell size of mordenite is 18.1×20.5×7.5 Å. Mordenite is also present as synthetic zeolite. Na-mordenite can adsorb molecules with an effective diameter up to about 7 Å. The mordenite preferably used in the present invention is represented by the general formula $xNa_2O.Al_2O_3.ySiO_2$, wherein x<1 and y<100, particularly preferably x<0.1 and y<30. The molar ratio of $SiO_2/Al_2O_3$ is preferably 100 mol/mol or less, particularly preferably 30 mol/mol or less, and still more particularly preferably 10 mol/mol or less. The cation content other than protons such as sodium is preferably 5 mass % or less, more preferably 3 mass % or less, and still more preferably 1 mass % or less.

The units forming the skeleton structure of β-zeolite (BEA) are a four-membered ring structure, five-membered ring structure, and six-membered ring structure. The micropore has a two-dimensional structure, with an entrance having a round shape formed of a non-plane 12-membered ring, and the crystal system is tetragonal. Beta polymorph A is represented by the molecular formulas $Na_7.Al_7Si_{57}O_{128}$ and the like and has a micropore diameter of 6.6×6.7 Å and 5.6×5.6 Å and a unit cell size of 12.661×12.661×26.406 Å. The molar ratio of $SiO_2/Al_2O_3$ is preferably 100 mol/mol or less, particularly preferably 30 mol/mol or less, and still more particularly preferably 10 mol/mol or less. The cation content other than protons such as sodium is preferably 5 mass % or less, more preferably 3 mass % or less, and still more preferably 1 mass % or less.

The charge compensation cation of the zeolite used in the present invention is proton, i.e. hydrogen. The content of cations other than proton such as sodium, potassium, magnesium, and calcium is preferably 5 mass % or less, more preferably 3 mass % or less, and still more preferably 1 mass % or less.

As preferable properties of zeolite crystals used in the present invention, crystallinity of 80% or more, particularly preferably 90% or more; crystallite diameter of 5 μm or less, particularly preferably 1 μm or less; average particle diameter of 30 μm or less, particularly preferably 10 μm or less; and specific surface area of 300 m²/g or more, particularly preferably 400 m²/g or more can be given.

The solid superacid catalyst refers to a catalyst comprising a solid acid with an acidity greater than 100% sulfuric acid, which has a Hammett acidity function $H_0$ of −11.93. Examples of such solid superacid catalysts include catalysts comprising a support such as hydroxide or oxide of silicon, aluminum, titanium, zirconium, tungsten, molybdenum, or iron, graphite, ion-exchange resin, or the like, and sulfuric acid radical, antimony pentafluoride, tantalum pentafluoride, boron trifluoride, or the like adhering to or supported on said support; catalysts comprising tungsten oxide ($WO_3$) supported on zirconium oxide ($ZrO_2$), stannic oxide ($SnO_2$), titania ($TiO_2$), ferric oxide ($Fe_2O_3$), or the like; and fluorosulfonic acid resin; and the like. Among these, as previously proposed by the present applicant, sulfated zirconia, sulfated alumina, sulfated tin oxide, sulfated iron oxide or sulfated titania produced by treating zirconia, alumina, tin oxide, iron oxide or titania with sulfuric acid, or tungstated zirconia tungstated tin oxide and the like which are obtained by mixing two or more metal oxides and/or hydrated oxides, kneading the mixed product and calcining the kneaded product are suitably used. (e.g., Japanese Patent Publication No. 59-6181, Japanese Patent Publication No. 59-40056, Japanese Patent Application Laid-open No. 04-187239, Japanese Patent Application Laid-open No. 04-187241, Japanese Patent Number 2566814, Japanese Patent Number 2992972, Japanese Patent Number 3251313, Japanese Patent Number 3328438, Japanese Patent Number 3432694, Japanese Patent Number 3517696, Japanese Patent Number 3553878, and Japanese Patent Number 3568372)

Acid strength ($H_0$) is defined as the capability of acid points on the surface of a catalyst for providing protons to a base or receiving electron pairs from the base, represented by a pKa value, and measured by a method known in the technique such as an indicator method, a basic gas adsorption method, or the like. For example, the acid strength of a solid acid catalyst can be directly measured using an acid-base indicator of which the pKa value is known. Specifically, the catalyst is dipped in a solution of p-nitrotoluene (pKa value; −11.4), m-nitrotoluene (pKa value; −12.0), p-nitrochlorobenzene (pKa value; −12.7), 2,4-dinitrotoluene (pKa value; −13.8), 2,4-dinitrofluorobenzene (pKa value; −14.5), 1,3,5-trichlorobenzene (pKa value; −16.1), or the like in dry cyclohexane or sulfuryl chloride, and a color change of the indicator on the catalyst surface is observed. If the color of the indicator changes into an acid color, the pKa of the catalyst is the same as or smaller than that of the indicator. A colored catalyst cannot be measured the acid strength using the indicator, but it is reported to be estimated from isomerization activity of butane or pentane ("Studies in Surface Science and Catalysis", Vol. 90, ACID-BASE CATALYSIS II, p. 507 (1994)).

Although the above-mentioned zeolites and solid superacid catalysts can be used as the solid acid catalyst as is, catalyst pellets containing 30 wt % or more, and preferably 60 wt % or more of such zeolites and solid superacid catalysts is preferably used. In order to increase the concentration gradient of sulfur compounds, in a case of flow process, the catalyst pellets preferably has a shape with a size as small as possible to the extent that the pressure drop between before and after the vessel loaded with a desulfurization catalyst is not unduly increased, preferably a spherical shape. In the case of a sphere, the diameter is preferably 0.5-5 mm, and particularly preferably 1-3 mm. In the case of a cylinder, the diameter is preferably 0.1-4 mm, particularly preferably 0.12-2 mm, and the length is preferably 0.5-5 times of the diameter, particularly preferably 1-2 times.

The specific surface area of the solid acid catalyst including the solid superacid catalyst, which significantly affects the sulfur compound adsorption capacity, is preferably 100 $m^2/g$ or more, more preferably 200 $m^2/g$ or more, and particularly preferably 300 $m^2/g$ or more. In order to increase the sulfur compound adsorption capacity, the volume of pores with a pore diameter of not more than 10 Å is preferably 0.10 ml/g or more, and particularly preferably 0.20 ml/g or more. In addition, in order to increase the diffusion rate of sulfur compounds in pores, the volume of pores with a pore diameter of not less than 10 Å to not more than 0.1 µm is preferably 0.05 ml/g or more, and particularly preferably 0.10 ml/g or more. In order to increase the mechanical strength of the molded product, the volume of pores with a pore diameter of not less than 0.1 µm is preferably 0.3 ml/g or less, and particularly preferably 0.25 ml/g or less. Usually, the specific surface area and total pore volume are measured by the nitrogen adsorption method, and the macropore volume is measured by the mercury porosimetry method. The nitrogen adsorption method is simple and commonly used. The method is described in a number of documents, for example, Washio, Kazuhiro; Shimadzu review, 48 (1), 35-49 (1991), ASTM (American Society for Testing and Materials) Standard Test Method D 4365-95, and the like.

When zeolite is used in pellets, it is possible to mold a half-finished product, followed by drying and calcining, or to add a binder (bonding agent), as required, to zeolite powder, and mold the mixture, followed by drying and calcining, as described in Japanese Patent Application Laid-open No. 4-198011.

As examples of the binder, inorganic bonding agents such as clays (e.g. alumina, smectite, etc.), water glass, and the like can be given. Although there are no specific limitations to the amount of these binders as much as the raw material can be molded, usually an amount of about 0.05-30 wt % to the raw material can be used. It is possible to increase the adsorption capability for sulfur compounds which are adsorbed on zeolites with difficulty by adding inorganic fine particles such as silica, alumina, and other zeolites or organic materials such as activated carbon, or to increase the diffusion rate of sulfur compounds by increasing the number of mesopores and macropores. The adsorption capability can also be improved by producing a complex material with metal. In the case of particles, the particles usually have an indefinite form with an average diameter of 0.8-1.7 mm. In order to prevent cracking of the adsorbent, the crash strength of the support is preferably 3.0 kg/pellet or more, and particularly preferably 3.5 kg/pellet or more. Usually, the crash strength can be measured using a compressive strength tester such as a Kiya-type tablet crash strength tester (manufactured by Toyama Sangyo Co., Ltd.).

As the kind of the transition metal oxide to be supported on activated carbon, oxides of silver, mercury, copper, cadmium, lead, molybdenum, zinc, cobalt, manganese, nickel, platinum, palladium, and iron can be given. Of these, oxides of copper, zinc and nickel are preferable in view of safety, economy, and the like. Copper oxide is particularly preferable due to the low price and the superior performance of adsorbing sulfur compounds in a wide temperature range from room temperature to about 300° C., in the state of copper oxide as-is without reduction treatment, and even in the absence of hydrogen.

The activated carbon used as the porous support is a porous particulate of which the major component is carbon and has a specific surface area of 500 $m^2/g$ or more, and preferably 700 $m^2/g$ or more. Although activated carbon may be used in the form of particle, fiber, powder, or pellets, activated carbon pellets is preferable. The moldings may be any of particulate, honeycomb, mat, felt and the like. Usually, the activated carbon has an indefinite form having an average diameter of 0.8-1.7 mm mainly. The crash strength of the support is preferably 3.0 kg/pellet or more, and particularly preferably 3.5 kg/pellet or more in order to prevent cracking of the adsorbent.

An activated carbon adsorbent containing copper oxide is preferably used. The content of the copper oxide (as Cu element) is preferably 0.1-30 wt %, and particularly preferably 10-20 wt % of the adsorbent. If required, the adsorbent may further contain components other than copper. Although zinc or iron may be contained as the components other than copper, the use of copper alone is most preferable. The amount of copper to the total amount of transition metals contained in the adsorbent is preferably 70 wt % or more, and particularly preferably 95 wt % or more.

Although either a batch process or a flow process may be used for bringing hydrocarbon oil into contact with the solid acid catalyst or the activated carbon containing a transition metal oxide, a flow process in which hydrocarbon oil is brought into pass through a vessel loaded with a solid acid catalyst pellets or activated carbon containing a transition metal oxide is preferred.

In the case of the flow process, the hydrocarbon oil is brought into contact under a pressure of atmospheric pressure to 50 kg/cm²·G, preferably atmospheric pressure to 10 kg/cm²·G, particularly preferably 0.1 to 3 kg/cm²·G and at a flow rate, in terms of LHSV, preferably of 0.1-100 hr⁻¹, particularly preferably 0.5-20 hr⁻¹. When the solid acid catalyst is used, a slightly high desulfurization temperature, e.g. 10-200° C., particularly 30-100° C., is preferable, because the reaction among the sulfur compounds and/or the reaction of the sulfur compounds with aromatic hydrocarbons that produces heavy sulfur compounds is accompanied. In the case of using the activated carbon containing a transition metal oxide, which is not expected to cause such a reaction to occur, but exhibits superior physical adsorption, as the temperature suitable for the physical adsorption, not higher than 150° C., particularly preferably 0-80° C., is preferably applied.

The solid acid catalyst and the activated carbon containing a transition metal oxide may be used either individually or in combination. The product produced by the reaction catalyzed by the solid acid catalyst may be adsorbed by the solid acid catalyst itself or by one or more other adsorbents such as activated alumina and activated carbon. When the solid acid catalyst is used in combination with the activated carbon containing a transition metal oxide or other adsorbents in a flow process, the solid acid catalyst is preferably placed in the upstream side and the activated carbon containing a transition metal oxide or other adsorbents are placed in the downstream side, whereby the product produced by the reaction catalyzed by the solid acid catalyst is preferably removed by the activated carbon containing a transition metal oxide or other adsorbents that are placed in downstream side. It is possible to remove sulfur compounds with increased molecular weight produced by the reaction catalyzed by the solid acid catalyst by distillation before removing the sulfur compounds by activated carbon or adsorbents.

A slight amount of water adsorbed in the adsorbent is preferably removed as a pretreatment for the adsorbent in advance. Adsorbed water not only inhibits adsorption of sulfur compounds, but is also released from the adsorbent immediately after feeding hydrocarbon oil and contaminates the hydrocarbon oil. Zeolite is dried preferably at about 130-500° C., and more preferably about 350-450° C. Activated carbon is dried preferably at about 100-200° C., if dried in an oxidative atmosphere such as in the air. A drying temperature of 200° C. or more is not preferable, because activated carbon reacts with oxygen, resulting in a decrease of weight. Under non-oxidative conditions, such as under a nitrogen atmosphere, activated carbon can be dried at about 100-800° C. Heat treatment at 400-800° C. is particularly preferable, because organic substances and oxygen contained can be removed, resulting in improved adsorption capability.

As the adsorption of the activated carbon containing a transition metal oxide is mainly physical adsorption, regeneration by desorption can be possible. The adsorbent after adsorption of sulfur compounds can be easily regenerated by desorption by means of washing with a solvent, heating in a nitrogen atmosphere, heating under reduced pressure, or the like. The adsorbent thus can be used repeatedly. In particular, heating under a non-oxidative atmosphere (usually under a nitrogen atmosphere) and/or under reduced pressure can ensure sufficient regeneration in a short period of time.

Thiophenes are heterocyclic sulfur compounds containing one or more sulfur atoms as a heteroatom, in which the hetero ring is a five-membered or six-membered ring having aromaticity (two or more double bonds) and not condensed with a benzene ring, and derivatives thereof. Thiophenes include a compound having a structure in which hetero rings condensed among themselves. Thiophene, which is also referred to as thiofuran, is a sulfur compound having a molecular formula of $C_4H_4S$ and a molecular weight of 84.1. Examples of other typical thiophenes include methylthiophene (thiotolene, molecular formula: $C_5H_6S$, molecular weight: 98.2), thiapyran (penthiophene, molecular formula: $C_5H_6S$, molecular weight: 98.2), thiophthene (molecular formula: $C_6H_4S_2$, molecular weight: 140), tetraphenylthiophene (thionessal, molecular formula: $C_{20}H_{20}S$, molecular weight: 388), dithienylmethane (molecular formula: $C_9H_8S_2$, molecular weight: 180), and derivatives of these compounds.

Benzothiophenes are heterocyclic sulfur compounds containing one or more sulfur atoms as a heteroatom, in which the hetero ring is a five-membered or six-membered ring having aromaticity (two or more double bonds) and condensed with one benzene ring, and derivatives thereof. Benzothiophene, which is also referred to as thionaphthene or thiocoumarone, is a sulfur compound having a molecular formula of $C_8H_6S$ and a molecular weight of 134. As examples of other typical benzothiophenes, alkylbenzothiophenes such as methylbenzothiophene, dimethylbenzothiophene, trimethylbenzothiophene, tetramethylbenzothiophene, pentamethylbenzothiophene, hexamethylbenzothiophene, methylethylbenzothiophene, dimethylethylbenzothiophene, trimethylethylbenzothiophene, tetramethylethylbenzothiophene, pentamethylethylbenzothiophene, methyldiethylbenzothiophene, dimethyldiethylbenzothiophene, trimethyldiethylbenzothiophene, tetramethyldiethylbenzothiophene, methylpropylbenzothiophene, dimethylpropylbenzothiophene, trimethylpropylbenzothiophene, tetramethylpropylbenzothiophene, pentamethylpropylbenzothiophene, methylethylpropylbenzothiophene, dimethylethylpropylbenzothiophene, trimethylethylpropylbenzothiophene, and tetramethylethylpropylbenzothiophene; thiachromene (benzo-γ-pyrane, molecular formula: $C_9H_8S$, molecular weight: 148), dithianaphthalene (molecular formula: $C_8H_6S_2$, molecular weight: 166), and derivatives of these compounds can be given.

Dibenzothiophenes are heterocyclic sulfur compounds containing one or more sulfur atoms as a heteroatom, in which the hetero ring is a five-membered or six-membered ring having aromaticity (two or more double bonds) and condensed with two benzene rings, and derivatives thereof. Dibenzothiophene, which is also referred to as diphenylene sulfide or biphenylene sulfide, is a sulfur compound having a molecular formula of $C_{12}H_8S$ and a molecular weight of 184. 4-methyldibenzothiophene and 4,6-dimethyldibenzothiophene are well known as difficultly desulfurized compounds in the art of hydrorefining. As examples of other typical dibenzothiophenes, alkyldibenzothiophenes such as trimethyldibenzothiophene, tetramethyldibenzothiophene, pentamethyldibenzothiophene, hexamethyldibenzothiophene, heptamethyldibenzothiophene, octamethyldibenzothiophene, methylethyldibenzothiophene, dimethylethyldibenzothiophene, trimethylethyldibenzothiophene, tetramethylethyldibenzothiophene, pentamethylethyldibenzothiophene, hexamethylethyldibenzothiophene, heptamethylethyldibenzothiophene, methyldiethyldibenzothiophene, dimethyldiethyldibenzothiophene, trimethyldiethyldibenzothiophene, tetramethyldiethyldibenzothiophene, pentamethyldiethyldibenzothiophene, hexamethyldiethyldibenzothiophene, heptamethyldiethyldibenzothiophene, methylpropyldibenzothiophene, dimethylpropyldibenzothiophene, trimethylpropyldibenzothiophene, tetramethylpropyldibenzothiophene, pentamethylpropyldibenzothiophene, hexamethylpropyldibenzothiophene, heptamethylpropyldibenzothiophene, methylethylpropyldibenzothiophene, dimethylethylpropyldibenzothiophene, trimethylethylpropyldibenzothiophene, tetramethylethylpropyldibenzothiophene, pentamethylethylpropyldibenzothiophene, and hexamethylethylpropyldibenzothiophene; thianthrene (diphenylene disulfide, molecular formula: $C_{12}H_8S_2$, molecular weight: 216), thioxanthene (dibenzothiopyran or diphenylmethane sulfide, molecular formula: $C_{13}H_{10}S$, molecular weight: 198), and derivatives of these compounds can be given.

Both thiophenes and benzothiophenes exhibit high reactivity of hetero rings containing a sulfur atom as a hetero atom. The hetero rings are easily cleaved, react with an aromatic ring, or are decomposed in the presence of a solid acid catalyst. Dibenzothiophenes are less reactive than thiophenes and benzothiophenes due to the possession of benzene rings bonded to both sides of a thiophene ring.

Therefore, the solid acid catalyst is more effective for the desulfurization of hydrocarbon oil not containing dibenzothiophenes, for example, kerosene not containing dibenzothiophenes. If kerosene with a dibenzothiophene concentration (as sulfur) of 0.1 ppm or less, preferably 0.01 ppm or less, and more preferably 0.001 ppm or less is desulfurized by the desulfurization method using a solid acid catalyst, the sulfur content can be reduced to an extremely low level. The desulfurized kerosene thus exhibits no detrimental effects on a reforming catalyst, which is extremely affected by sulfur, in a fuel cell system for producing hydrogen for fuel cell from hydrocarbon oil. Therefore, the desulfurization method of the present invention is particularly suitably applied to a fuel cell system.

The present invention will be explained in more detail by examples that are not intended to be limiting of the present invention.

Example 1

4.0 g of benzothiophene (special grade reagent, manufactured by Tokyo Kasei Kogyo Co., Ltd.) was diluted to 10 mass % with toluene (special grade reagent, manufactured by Junsei Chemical Co., Ltd.) and 1.0 g of acid catalyst H-Y zeolite ("HSZ-330HUA" manufactured by Tosoh Corp., $SiO_2/Al_2O_3$ ratio: 6 mol/mol, Na content: 0.2 mass %, specific surface area: 550 m$^2$/g, crystallite diameter: 0.2-0.4 μm, particle diameter: 6-8 μm) dried at 400° C. for 3 hours was immersed in the diluted solution at room temperature for 36 hours. The supernatant was collected and analyzed by a gas chromatograph mass spectroscope (GC-MS). As sulfur compounds, in addition to benzothiophenes, diphenylpropenethiol, phenylbenzothiophenes, and other heavier sulfur compounds were identified.

Example 2

1.0 g of acid catalyst dried at 400° C. for 3 hours was immersed in 4.0 g of 2-methylthiophene (special grade reagent, manufactured by Tokyo Kasei Kogyo Co., Ltd.) diluted to 10 mass % with a decane solvent (special grade reagent, manufactured by Junsei Chemical Co., Ltd.) at room temperature for not less than 24 hours. The contents of sulfur compounds before and after the immersion were analyzed by gas chromatograph to determine the adsorption capacity of the adsorbent. The following zeolites ground into powder were used as acid catalysts: three types of H-Y zeolites manufactured by Tosoh Corp., having a differing $SiO_2/Al_2O_3$ ratio each other: ("HSZ-320HOA" (Example 2-1), $SiO_2/Al_2O_3$ ratio: 5.5 mol/mol, Na content: 3 mass %, specific surface area: 550 m$^2$/g; "HSZ-330HUA" (Example 2-2), $SiO_2/Al_2O_3$ ratio: 6.0 mol/mol, Na content: 0.2 mass %, specific surface area: 550 m$^2$/g; and "HSZ-390HUD3C" (Example 2-3), $SiO_2/Al_2O_3$ ratio: 360 mol/mol, Na content: 0.03 mass %); and H-β zeolite manufactured by Tosoh Corp. ("HSZ-930HOD1A" (Example 2-4), $SiO_2/Al_2O_3$ ratio: 27.4 mol/mol, Na content: 0.02 mass %).

The same experiments were carried out using the following catalysts or adsorbents as Comparative Examples: NaY zeolite manufactured by Tosoh Corp. ("HSZ-320NAA" (Comparative Example 2-1), $SiO_2/Al_2O_3$ ratio: 5.5 mol/mol, Na content: 8 mass %, specific surface area: 700 m$^2$/g); NaX zeolite manufactured by Wako Pure Chemical Industries, Ltd. ("F-9" (Comparative Example 2-2), $SiO_2/Al_2O_3$ ratio: 2.5 mol/mol, Na content: 12 mass %); KL zeolite manufactured by Tosoh Corp. ("HSZ-550KOA" (Comparative Example 2-3), $SiO_2/Al_2O_3$ ratio: 6.1 mol/mol, K content: 7 mass %, Na content: 0.2 mass %, specific surface area: 280 m$^2$/g); Na mordenite manufactured by Tosoh Corp. ("HSZ-642NAA" (Comparative Example 2-4), $SiO_2/Al_2O_3$ ratio: 18.3 mol/mol, Na content: 4 mass %, specific surface area: 360 m$^2$/g); K ferrierite manufactured by Tosoh Corp. ("HSZ-720KOA" (Comparative Example 2-5), $SiO_2/Al_2O_3$ ratio: 18.2 mol/mol, K content: 2 mass %, Na content: 1 mass %, specific surface area: 170 m$^2$/g); silica gel manufactured by Wako Pure Chemical Industries, Ltd. ("WAKOGEL-G" (Comparative Example 2-6), specific surface area: 687 m$^2$/g); activated alumina manufactured by Alcoa Inc. ("F-200" (Comparative Example 2-7), specific surface area: 350 m$^2$/g); copper oxide supported on alumina ("NK-311" manufactured by Orient Catalyst Co., Ltd., (Comparative Example 2-8), copper content: 7.6 mass %, specific surface area: 264 m$^2$/g); nickel oxide supported on alumina ("NK-392" manufactured by Orient Catalyst Co., Ltd., (Comparative Example 2-9), nickel oxide content: 50 mass %); zinc oxide ("NK-301H" manufactured by Orient Catalyst Co., Ltd., (Comparative Example 2-10), zinc oxide content: 99 mass %, specific surface area: 10 m$^2$/g); and activated carbon ("Darco KB" manufactured by Aldrich Corp. (Comparative Example 2-11), specific surface area: 1,500 m$^2$/g).

NaY zeolite, NaX zeolite, KL zeolite, Na mordenite, and K ferrierite used in Comparative Examples 2-1 to 2-5 are not acid catalysts, but are generally weakly acidic (or not acidic) adsorbents.

TABLE 1

| | Kind of catalyst or adsorbent | $SiO_2/Al_2O_3$ ratio | Adsorption capacity [g-S/kg-adsorbent] |
|---|---|---|---|
| Example 2-1 | H—Y zeolite | 5.5 | 93 |
| Example 2-2 | H—Y zeolite | 6.0 | 110 |
| Example 2-3 | H—Y zeolite | 360 | 52 |
| Example 2-4 | H-β zeolite | 27.4 | 123 |
| Comparative example 2-1 | NaY zeolite | 5.5 | 91 |
| Comparative example 2-2 | NaX zeolite | 2.5 | 76 |
| Comparative example 2-3 | KL zeolite | 6.1 | 36 |
| Comparative example 2-4 | Na mordenite | 18.3 | 16 |
| Comparative example 2-5 | K ferrierite | 18.2 | 5 |
| Comparative example 2-6 | Silica gel | — | 32 |
| Comparative | Alumina | — | 21 |

TABLE 1-continued

| | Kind of catalyst or adsorbent | SiO$_2$/Al$_2$O$_3$ ratio | Adsorption capacity [g-S/kg-adsorbent] |
|---|---|---|---|
| example 2-7 | | | |
| Comparative example 2-8 | Copper oxide supported on alumina | — | 17 |
| Comparative example 2-9 | Nickel oxide supported on alumina | — | 15 |
| Comparative example 2-10 | Zinc oxide | — | 4 |
| Comparative example 2-11 | Activated carbon | — | 33 |

Example 3

1.0 g of acid catalyst dried at 400° C. for 3 hours was immersed in 4.0 g of 2-methylthiophene (special grade reagent, manufactured by Tokyo Kasei Kogyo Co., Ltd.) diluted to 10 mass % with a toluene solvent (special grade reagent, manufactured by Junsei Chemical Co., Ltd.) at room temperature for not less than 24 hours. The contents of sulfur compounds before and after the immersion were analyzed by gas chromatograph to determine the adsorption capacity of the adsorbent. As the acid catalyst, the following zeolites ground into powder were used: three types of H-Y zeolites (manufactured by Tosoh Corp.), each having an SiO$_2$/Al$_2$O$_3$ ratio differing from the others: ("HSZ-320HOA" (Example 3-1), SiO$_2$/Al$_2$O$_3$ ratio: 5.5 mol/mol, Na content: 3 mass %, specific surface area: 550 m$^2$/g; "HSZ-330HUA" (Example 3-2), SiO$_2$/Al$_2$O$_3$ ratio: 6.0 mol/mol, Na content: 0.2 mass %, specific surface area: 550 m$^2$/g; and "HSZ-390HUD3C" (Example 3-3), SiO$_2$/Al$_2$O$_3$ ratio: 360 mol/mol, Na content: 0.03 mass %); H-mordenite manufactured by Tosoh Corp. ("HSZ-640HOA" (Example 3-4), SiO$_2$/Al$_2$O$_3$ ratio: 18.3 mol/mol, Na content: 0.3 mass %, specific surface area: 380 m$^2$/g); and H-β zeolite manufactured by Tosoh Corp. ("HSZ-930HOD1A" (Example 3-5), SiO$_2$/Al$_2$O$_3$ ratio: 27.4 mol/mol, Na content: 0.02 mass %).

The same experiments were carried out using the following catalysts or adsorbents as Comparative Examples: NaY zeolite manufactured by Tosoh Corp. ("HSZ-320NAA" (Comparative Example 3-1), SiO$_2$/Al$_2$O$_3$ ratio: 5.5 mol/mol, Na content: 8 mass %, specific surface area: 700 m$^2$/g); NaX zeolite manufactured by Wako Pure Chemical Industries, Ltd. ("F-9" (Comparative Example 3-2), SiO$_2$/Al$_2$O$_3$ ratio: 2.5 mol/mol, Na content: 12 mass %); KL zeolite manufactured by Tosoh Corp. ("HSZ-550KOA" (Comparative Example 3-3), SiO$_2$/Al$_2$O$_3$ ratio: 6.1 mol/mol, K content: 7 mass %, Na content: 0.2 mass %, specific surface area: 280 m$^2$/g); Na mordenite manufactured by Tosoh Corp. ("HSZ-642NAA" (Comparative Example 3-4), SiO$_2$/Al$_2$O$_3$ ratio: 18.3 mol/mol, Na content: 4 mass %, specific surface area: 360 m$^2$/g); K ferrierite manufactured by Tosoh Corp. ("HSZ-720KOA" (Comparative Example 3-5), SiO$_2$/Al$_2$O$_3$ ratio: 18.2 mol/mol, K content: 2 mass %, Na content: 1 mass %, specific surface area: 170 m$^2$/g); silica gel manufactured by Wako Pure Chemical Industries, Ltd. ("WAKOGEL-G" (Comparative Example 3-6), specific surface area: 687 m$^2$/g) activated alumina manufactured by Alcoa Inc. ("F-200" (Comparative Example 3-7), specific surface area: 350 m$^2$/g) copper oxide supported on alumina ("NK-311" manufactured by Orient Catalyst Co., Ltd., (Comparative Example 3-8), copper content: 7.6 mass %, specific surface area: 264 m$^2$/g); nickel oxide supported on alumina ("NK-392" manufactured by Orient Catalyst Co., Ltd., (Comparative Example 3-9), nickel oxide content: 50 mass %); zinc oxide ("NK-301 H" manufactured by Orient Catalyst Co., Ltd., (Comparative Example 3-10), zinc oxide content: 99 mass %, specific surface area: 10 m$^2$/g); and activated carbon ("Darco KB" manufactured by Aldrich Corp. (Comparative Example 3-11), specific surface area: 1500 m$^2$/g).

TABLE 2

| | Kind of catalyst or adsorbent | SiO$_2$/Al$_2$O$_3$ ratio | Adsorption capacity [g-S/kg-adsorbent] |
|---|---|---|---|
| Example 3-1 | H—Y zeolite | 5.5 | 85 |
| Example 3-2 | H—Y zeolite | 6.0 | 122 |
| Example 3-3 | H—Y zeolite | 360 | 8 |
| Example 3-4 | H-mordenite | 18.3 | 70 |
| Example 3-5 | H-β zeolite | 27.4 | 120 |
| Comparative example 3-1 | NaY zeolite | 5.5 | 0 |
| Comparative example 3-2 | NaX zeolite | 2.5 | 3 |
| Comparative example 3-3 | KL zeolite | 6.1 | 1 |
| Comparative example 3-4 | Na mordenite | 18.3 | 1 |
| Comparative example 3-5 | K ferrierite | 18.2 | 0 |
| Comparative example 3-6 | Silica gel | — | 1 |
| Comparative example 3-7 | Alumina | — | 2 |
| Comparative example 3-8 | Copper oxide supported on alumina | — | 1 |
| Comparative example 3-9 | Nickel oxide supported on alumina | — | 1 |
| Comparative example 3-10 | Zinc oxide | — | 0 |
| Comparative example 3-11 | Activated carbon | — | 5 |

Example 4

1.0 g of acid catalyst dried at 400° C. for 3 hours was immersed in 4.0 g of benzothiophene (special grade reagent, manufactured by Tokyo Kasei Kogyo Co., Ltd.) diluted to 10 mass % with a decane solvent (special grade reagent, manufactured by Junsei Chemical Co., Ltd.) at room temperature for not less than 24 hours. The contents of sulfur compounds before and after immersion were analyzed by gas chromatography to determine the adsorption capacity of the adsorbent. The following zeolites ground into powder were used as acid catalysts: three types of H-Y zeolites manufactured by Tosoh Corp., each having an SiO$_2$/Al$_2$O$_3$ ratio differing from the others: ("HSZ-320HOA" (Example 4-1), SiO$_2$/Al$_2$O$_3$ ratio: 5.5 mol/mol, Na content: 3 mass %, specific surface area: 550 m$^2$/g; "HSZ-330HUA" (Example 4-2), SiO$_2$/Al$_2$O$_3$ ratio: 6.0 mol/mol, Na content: 0.2 mass %, specific surface area: 550 m$^2$/g; "HSZ-390HUD3C" (Example 4-3), SiO$_2$/Al$_2$O$_3$ ratio: 360 mol/mol, Na content: 0.03 mass %); and H-β zeolite manufactured by Tosoh Corp. ("HSZ-930HOD1A" (Example 4-4), SiO$_2$/Al$_2$O$_3$ ratio: 27.4 mol/mol, Na content: 0.02 mass %).

The same experiments were carried out using the following catalysts or adsorbents as Comparative Examples: KL zeolite manufactured by Tosoh Corp. ("HSZ-550KOA" (Comparative Example 4-1), SiO$_2$/Al$_2$O$_3$ ratio: 6.1 mol/mol, K content: 7 mass %, Na content: 0.2 mass %, specific surface area: 280 m$^2$/g); Na mordenite manufactured by Tosoh Corp. ("HSZ-642NAA" (Comparative Example 4-2), SiO$_2$/Al$_2$O$_3$ ratio:

18.3 mol/mol, Na content: 4 mass %, specific surface area: 360 m²/g); K ferrierite manufactured by Tosoh Corp. ("HSZ-720KOA" (Comparative Example 4-3), $SiO_2/Al_2O_3$ ratio: 18.2 mol/mol, K content: 2 mass %, Na content: 1 mass %, specific surface area: 170 m²/g); silica gel manufactured by Wako Pure Chemical Industries, Ltd. ("WAKOGEL-G" (Comparative Example 4-4), specific surface area: 687 m²/g); activated alumina manufactured by Alcoa Inc. ("F-200" (Comparative Example 4-5), specific surface area: 350 m²/g); copper oxide supported on alumina ("NK-311" manufactured by Orient Catalyst Co., Ltd., (Comparative Example 4-6), copper content: 7.6 mass %, specific surface area: 264 m²/g); nickel oxide supported on alumina ("NK-392" manufactured by Orient Catalyst Co., Ltd., (Comparative Example 4-7), nickel oxide content: 50 mass %); and zinc oxide ("NK-301H" manufactured by Orient Catalyst Co., Ltd., (Comparative Example 4-8), zinc oxide content: 99 mass %, specific surface area: 10 m²/g).

TABLE 3

| | Kind of catalyst or adsorbent | $SiO_2/Al_2O_3$ ratio | Adsorption capacity [g-S/kg-adsorbent] |
|---|---|---|---|
| Example 4-1 | H—Y zeolite | 5.5 | 73 |
| Example 4-2 | H—Y zeolite | 6.0 | 76 |
| Example 4-3 | H—Y zeolite | 360 | 25 |
| Example 4-4 | H-β zeolite | 27.4 | 37 |
| Comparative example 4-1 | KL zeolite | 6.1 | 27 |
| Comparative example 4-2 | Na mordenite | 18.3 | 4 |
| Comparative example 4-3 | K ferrierite | 18.2 | 2 |
| Comparative example 4-4 | Silica gel | — | 34 |
| Comparative example 4-5 | Alumina | — | 23 |
| Comparative example 4-6 | Copper oxide supported on alumina | — | 22 |
| Comparative example 4-7 | Nickel oxide supported on alumina | — | 15 |
| Comparative example 4-8 | Zinc oxide | — | 5 |

Example 5

1.0 g of acid catalyst dried at 400° C. for 3 hours was immersed in 4.0 g of benzothiophene (special grade reagent, manufactured by Tokyo Kasei Kogyo Co., Ltd.) diluted to 10 mass % with a toluene solvent (special grade reagent, manufactured by Junsei Chemical Co., Ltd.) at room temperature for not less than 24 hours. The contents of sulfur compounds before and after immersion were analyzed by gas chromatography to determine the adsorption capacity of the adsorbent. The following zeolites ground into powder were used as acid catalysts: three types of H-Y zeolites manufactured by Tosoh Corp., each having an $SiO_2/Al_2O_3$ ratio differing from the others: ("HSZ-320HOA" (Example 5-1), $SiO_2/Al_2O_3$ ratio: 5.5 mol/mol, Na content: 3 mass %, specific surface area: 550 m²/g; "HSZ-330HUA" (Example 5-2), $SiO_2/Al_2O_3$ ratio: 6.0 mol/mol, Na content: 0.2 mass %, specific surface area: 550 m²/g; and "HSZ-390HUD3C" (Example 5-3), $SiO_2/Al_2O_3$ ratio: 360 mol/mol, Na content: 0.03 mass %).

The same experiments were carried out using the following catalysts or adsorbents as Comparative Examples: NaY zeolite manufactured by Tosoh Corp. ("HSZ-320NAA" (Comparative Example 5-2), $SiO_2/Al_2O_3$ ratio: 5.5 mol/mol, Na content: 8 mass %, specific surface area: 700 m²/g); NaX zeolite manufactured by Wako Pure Chemical Industries, Ltd. ("F-9" (Comparative Example 5-3), $SiO_2/Al_2O_3$ ratio: 2.5 mol/mol, Na content: 12 mass %); KL zeolite manufactured by Tosoh Corp. ("HSZ-550KOA" (Comparative Example 5-4), $SiO_2/Al_2O_3$ ratio: 6.1 mol/mol, K content: 7 mass %, Na content: 0.2 mass %, specific surface area: 280 m²/g); Na mordenite manufactured by Tosoh Corp. ("HSZ-642NAA" (Comparative Example 5-5), $SiO_2/Al_2O_3$ ratio: 18.3 mol/mol, Na content: 4 mass %, specific surface area: 360 m²/g); K ferrierite manufactured by Tosoh Corp. ("HSZ-720KOA" (Comparative Example 5-6), $SiO_2/Al_2O_3$ ratio: 18.2 mol/mol, K content: 2 mass %, Na content: 1 mass %, specific surface area: 170 m²/g); silica gel manufactured by Wako Pure Chemical Industries, Ltd. ("WAKOGEL-G" (Comparative Example 5-7), specific surface area: 687 m²/g); activated alumina manufactured by Alcoa Inc. ("F-200" (Comparative Example 5-8), specific surface area: 350 m²/g); copper oxide supported on alumina ("NK-311" manufactured by Orient Catalyst Co., Ltd., (Comparative Example 5-9), copper content: 7.6 mass %, specific surface area: 264 m²/g); nickel oxide supported on alumina ("NK-392" manufactured by Orient Catalyst Co., Ltd., (Comparative Example 5-10), nickel oxide content: 50 mass %); zinc oxide ("NK-301H" manufactured by Orient Catalyst Co., Ltd., (Comparative Example 5-11), zinc oxide content: 99 mass %, specific surface area: 10 m²/g); and activated carbon ("Darco KB" manufactured by Aldrich Corp. (Comparative Example 5-12), specific surface area: 1,500 m²/g).

TABLE 4

| | Kind of catalyst or adsorbent | $SiO_2/Al_2O_3$ ratio | Adsorption capacity [g-S/kg-adsorbent] |
|---|---|---|---|
| Example 5-1 | H—Y zeolite | 5.5 | 46 |
| Example 5-2 | H—Y zeolite | 6.0 | 78 |
| Example 5-3 | H—Y zeolite | 360 | 3 |
| Comparative example 5-1 | NaY zeolite | 5.5 | 0 |
| Comparative example 5-2 | NaX zeolite | 2.5 | 13 |
| Comparative example 5-3 | KL zeolite | 6.1 | 0 |
| Comparative example 5-4 | Na mordenite | 18.3 | 0 |
| Comparative example 5-5 | K ferrierite | 18.2 | 0 |
| Comparative example 5-6 | Silica gel | — | 2 |
| Comparative example 5-7 | Alumina | — | 3 |
| Comparative example 5-8 | Copper oxide supported on alumina | — | 8 |
| Comparative example 5-9 | Nickel oxide supported on alumina | — | 4 |
| Comparative example 5-10 | Zinc oxide | — | 0 |
| Comparative example 5-11 | Activated carbon | — | 2 |

Example 6

1.0 g of acid catalyst dried at 400° C. for 3 hours was immersed in 6.0 g of thiophene (special grade reagent, manufactured by Tokyo Kasei Kogyo Co., Ltd.) diluted to 100 ppm (mass) with a toluene solvent (special grade reagent, manufactured by Junsei Chemical Co., Ltd.) at 50° C. for 4 hours. The contents of sulfur compounds before and after immersion were analyzed by a combustion oxidation fluorescence method to determine the adsorption capacity of the adsorbent.

The following zeolites ground into powder were used as acid catalysts: three types of H-Y zeolites manufactured by Tosoh Corp., each having an $SiO_2/Al_2O_3$ ratio differing from the others: ("HSZ-320HOA" (Example 6-1), $SiO_2/Al_2O_3$ ratio: 5.5 mol/mol, Na content: 3 mass %, specific surface area: 550 m²/g; "HSZ-330HUA" (Example 6-1), $SiO_2/Al_2O_3$ ratio: 6.0 mol/mol, Na content: 0.2 mass %, specific surface area: 550 m²/g; and "HSZ-390HUD3C" (Example 6-3), $SiO_2/Al_2O_3$ ratio: 360 mol/mol, Na content: 0.03 mass %); and H-β zeolite manufactured by Tosoh Corp. ("HSZ-930HOD1A" (Example 6-4), $SiO_2/Al_2O_3$ ratio: 27.4 mol/mol, Na content: 0.02 mass %).

The same experiments were carried out using the following catalysts or adsorbents as Comparative Examples: NaX zeolite manufactured by Wako Pure Chemical Industries, Ltd. ("F-9" (Comparative Example 6-1), $SiO_2/Al_2O_3$ ratio: 2.5 mol/mol, Na content: 12 mass %); copper oxide supported on alumina ("NK-311" manufactured by Orient Catalyst Co., Ltd., (Comparative Example 6-2), copper content: 7.6 mass %, specific surface area: 264 m²/g); nickel oxide supported on alumina ("NK-392" manufactured by Orient Catalyst Co., Ltd., (Comparative Example 6-3), nickel oxide content: 50 mass %); and zinc oxide ("NK-301H" manufactured by Orient Catalyst Co., Ltd., (Comparative Example 6-4), zinc oxide content: 99 mass %, specific surface area: 10 m²/g).

TABLE 5

| | Kind of catalyst or adsorbent | $SiO_2/Al_2O_3$ ratio | Adsorption capacity [g-S/kg-adsorbent] |
|---|---|---|---|
| Example 6-1 | H—Y zeolite | 5.5 | 22 |
| Example 6-2 | H—Y zeolite | 6.0 | 52 |
| Example 6-3 | H—Y zeolite | 360 | 19 |
| Example 6-4 | H-β zeolite | 27.4 | 40 |
| Comparative example 6-1 | NaX zeolite | 2.5 | 17 |
| Comparative example 6-2 | Copper oxide supported on alumina | — | 12 |
| Comparative example 6-3 | Nickel oxide supported on alumina | — | 9 |
| Comparative example 6-4 | Zinc oxide | — | 4 |

Example 7

1.0 g of acid catalyst dried at 400° C. for 3 hours was immersed in 6.0 g of thiophene (special grade reagent, manufactured by Tokyo Kasei Kogyo Co., Ltd.) diluted to 10 ppm (mass) with a toluene solvent (special grade reagent, manufactured by Junsei Chemical Co., Ltd.) at 50° C. for 4 hours. The contents of sulfur compounds before and after immersion were analyzed by a combustion oxidation fluorescence method to determine the adsorption capacity of the adsorbent. The following zeolites ground into powder were used as acid catalysts: three types of H-Y zeolites manufactured by Tosoh Corp., each having an $SiO_2/Al_2O_3$ ratio differing from the others: ("HSZ-320HOA" (Example 7-1), $SiO_2/Al_2O_3$ ratio: 5.5 mol/mol, Na content: 3 mass %, specific surface area: 550 m²/g; "HSZ-330HUA" (Example 7-2), $SiO_2/Al_2O_3$ ratio: 6.0 mol/mol, Na content: 0.2 mass %, specific surface area: 550 m²/g; and "HSZ-390HUD3C" (Example 7-3), $SiO_2/Al_2O_3$ ratio: 360 mol/mol, Na content: 0.03 mass %); and H-β zeolite manufactured by Tosoh Corp. ("HSZ-930HOD1A" (Example 7-4), $SiO_2/Al_2O_3$ ratio: 27.4 mol/mol, Na content: 0.02 mass %).

The same experiments were carried out using the following catalysts or adsorbents as Comparative Examples: NaX zeolite manufactured by Wako Pure Chemical Industries, Ltd. ("F-9" (Comparative Example 7-1), $SiO_2/Al_2O_3$ ratio: 2.5 mol/mol, Na content: 12 mass %); copper oxide supported on alumina ("NK-311" manufactured by Orient Catalyst Co., Ltd., (Comparative Example 7-2), copper content: 7.6 mass %, specific surface area: 264 m²/g); nickel oxide supported on alumina ("NK-392" manufactured by Orient Catalyst Co., Ltd., (Comparative Example 7-3), nickel oxide content: 50 mass %); and zinc oxide ("NK-301H" manufactured by Orient Catalyst Co., Ltd., (Comparative Example 7-4), zinc oxide content: 99 mass %, specific surface area: 10 m²/g).

TABLE 6

| | Kind of catalyst or adsorbent | $SiO_2/Al_2O_3$ ratio | Adsorption capacity [g-S/kg-adsorbent] |
|---|---|---|---|
| Example 7-1 | H—Y zeolite | 5.5 | 1.8 |
| Example 7-2 | H—Y zeolite | 6.0 | 6.6 |
| Example 7-3 | H—Y zeolite | 360 | 1.2 |
| Example 7-4 | H-β zeolite | 27.4 | 6.3 |
| Comparative example 7-1 | NaX zeolite | 2.5 | 1.8 |
| Comparative example 7-2 | Copper oxide supported on alumina | — | 0.9 |
| Comparative example 7-3 | Nickel oxide supported on alumina | — | 0.9 |
| Comparative example 7-4 | Zinc oxide | — | 0.0 |

Example 8

1.0 g of acid catalyst dried at 400° C. for 3 hours was immersed in 9.0 g of thiophene (special grade reagent, manufactured by Tokyo Kasei Kogyo Co., Ltd.) diluted to 1 ppm (mass) with a toluene solvent (special grade reagent, manufactured by Junsei Chemical Co., Ltd.) at 50° C. for 4 hours. The contents of sulfur compounds before and after immersion were analyzed by a combustion oxidation fluorescence method to determine the adsorption capacity of the adsorbent. The following zeolites ground into powder were used as acid catalysts: three types of H-Y zeolites manufactured by Tosoh Corp., each having an $SiO_2/Al_2O_3$ ratio differing from the others: ("HSZ-320HOA" (Example 8-1), $SiO_2/Al_2O_3$ ratio: 5.5 mol/mol, Na content: 3 mass %, specific surface area: 550 m²/g; "HSZ-330HUA" (Example 8-2), $SiO_2/Al_2O_3$ ratio: 6.0 mol/mol, Na content: 0.2 mass %, specific surface area: 550 m²/g; and "HSZ-390HUD3C" (Example 8-3), $SiO_2/Al_2O_3$ ratio: 360 mol/mol, Na content: 0.03 mass %); and H-β zeolite manufactured by Tosoh Corp. ("HSZ-930HOD1A" (Example 8-4), $SiO_2/Al_2O_3$ ratio: 27.4 mol/mol, Na content: 0.02 mass %).

The same experiments were carried out using the following catalysts or adsorbents as Comparative Examples: NaX zeolite manufactured by Wako Pure Chemical Industries, Ltd. ("F-9" (Comparative Example 8-1), $SiO_2/Al_2O_3$ ratio: 2.5 mol/mol, Na content: 12 mass %); copper oxide supported on alumina ("NK-311" manufactured by Orient Catalyst Co., Ltd., (Comparative Example 8-2), copper content: 7.6 mass %, specific surface area: 264 m²/g); nickel oxide supported on alumina ("NK-392" manufactured by Orient Catalyst Co., Ltd., (Comparative Example 8-3), nickel oxide content: 50 mass %); and zinc oxide ("NK-301H" manufactured by Orient Catalyst Co., Ltd., (Comparative Example 8-4), zinc oxide content: 99 mass %, specific surface area: 10 m²/g).

TABLE 7

| | Kind of catalyst or adsorbent | SiO$_2$/Al$_2$O$_3$ ratio | Adsorption capacity [g-S/kg-adsorbent] |
|---|---|---|---|
| Example 8-1 | H—Y zeolite | 5.5 | 0.4 |
| Example 8-2 | H—Y zeolite | 6.0 | 0.9 |
| Example 8-3 | H—Y zeolite | 360 | 0.0 |
| Example 8-4 | H-β zeolite | 27.4 | 0.9 |
| Comparative example 8-1 | NaX zeolite | 2.5 | 0.3 |
| Comparative example 8-2 | Copper oxide supported on alumina | — | 0.3 |
| Comparative example 8-3 | Nickel oxide supported on alumina | — | 0.0 |
| Comparative example 8-4 | Zinc oxide | — | 0.1 |

Example 9

1.0 g of acid catalyst dried at 400° C. for 3 hours was immersed in 9.0 g of benzene (pure benzene, manufactured by Nikko Petrochemical Co., Ltd., sulfur content: 0.38 ppm (mass)) at 50° C. for 5 hours. The contents of sulfur compounds before and after immersion were analyzed by a combustion oxidation fluorescence method to determine the adsorption capacity of the adsorbent. As the acid catalyst, the following zeolites ground into powder were used: H-Y zeolite manufactured by Tosoh Corp. ("HSZ-330HUA" (Comparative Example 9-1), SiO$_2$/Al$_2$O$_3$ ratio: 6.0 mol/mol, Na content: 0.2 mass %, specific surface area: 550 m²/g) and H-β zeolite manufactured by Tosoh Corp. ("HSZ-930HOD1A" (Example 9-2), SiO$_2$/Al$_2$O$_3$ ratio: 27.4 mol/mol, Na content: 0.02 mass %).

The same experiments were carried out using the following catalysts or adsorbents as Comparative Examples: NaY zeolite manufactured by Tosoh Corp. ("HSZ-320NAA" (Comparative Example 9-1), SiO$_2$/Al$_2$O$_3$ ratio: 5.5 mol/mol, Na content: 8 mass %, specific surface area: 700 m²/g); NaX zeolite manufactured by Wako Pure Chemical Industries, Ltd. ("F-9" (Comparative Example 9-2), SiO$_2$/Al$_2$O$_3$ ratio: 2.5 mol/mol, Na content: 12 mass %); KL zeolite manufactured by Tosoh Corp. ("HSZ-550KOA" (Comparative Example 9-3), SiO$_2$/Al$_2$O$_3$ ratio: 6.1 mol/mol, K content: 7 mass %, Na content: 0.2 mass %, specific surface area: 280 m²/g); activated alumina manufactured by Alcoa Inc. ("F-200" (Comparative Example 9-4), specific surface area: 350 m²/g); and copper oxide supported on alumina ("NK-311" manufactured by Orient Catalyst Co., Ltd., (Comparative Example 9-5), copper content: 7.6 mass %, specific surface area: 264 m²/g).

TABLE 8

| | Kind of catalyst or adsorbent | SiO$_2$/Al$_2$O$_3$ ratio | Desulfurization ratio [%] | Adsorption capacity [g-S/kg-adsorbent] |
|---|---|---|---|---|
| Example 9-1 | H—Y zeolite | 6.0 | 24 | 0.8 |
| Example 9-2 | H-β zeolite | 27.4 | 29 | 1.0 |
| Comparative example 9-1 | NaY zeolite | 5.5 | 11 | 0.4 |
| Comparative example 9-2 | NaX zeolite | 2.5 | 13 | 0.5 |
| Comparative example 9-3 | KL zeolite | 6.1 | 5 | 0.2 |

TABLE 8-continued

| | Kind of catalyst or adsorbent | SiO$_2$/Al$_2$O$_3$ ratio | Desulfurization ratio [%] | Adsorption capacity [g-S/kg-adsorbent] |
|---|---|---|---|---|
| Comparative example 9-4 | Alumina | — | 11 | 0.4 |
| Comparative example 9-5 | Copper oxide supported on alumina | — | 16 | 0.5 |

Example 10

1.0 g of adsorbent dried at 150° C. for 3 hours was immersed in 9.0 g of benzene (pure benzene, manufactured by Nikko Petrochemical Co., Ltd., sulfur content: 0.78 ppm (mass)) at 10° C. for not less than 48 hours. The contents of sulfur compounds before and after immersion were analyzed by a combustion oxidation fluorescence method to determine the adsorption capacity of the adsorbent. As the adsorbent, copper oxide supported on activated carbon ("NSR-1" manufactured by Toyo CCI Co., Ltd., Example 10-1), copper content: 12.7 mass %, specific surface area: 790 m²/g) and activated carbon ("Darco KB" manufactured by Aldrich Corp. (Comparative Example 10-1), specific surface area: 1,500 m²/g) were used.

TABLE 9

| | Kind of catalyst or adsorbent | Desulfurization ratio [%] | Adsorption capacity [g-S/kg-adsorbent] |
|---|---|---|---|
| Example 10-1 | Copper oxide supported on activated carbon | 42 | 3.0 |
| Comparative example 10-1 | Activated carbon | 18 | 1.3 |

Example 11

1.0 g of solid superacid catalyst was immersed in 20 g of kerosene (manufactured by Japan Energy Corp.) at 10° C. for not less than 24 hours. The contents of sulfur compounds before and after immersion were analyzed by a combustion oxidation-ultraviolet fluorescence method. Properties of the kerosene were as follows: Boiling point range: 158.5-270.0° C., 5% distillation point: 170.5° C., 10% distillation point: 175.0° C., 20% distillation point: 181.5° C., 30% distillation point: 188.0° C., 40% distillation point: 194.5° C., 50% distillation point: 202.5° C., 60% distillation point: 211.0° C., 70% distillation point: 221.0° C., 80% distillation point: 232.0° C., 90% distillation point: 245.5° C., 95% distillation point: 256.5° C., 97% distillation point: 263.5° C., density (15° C.): 0.7982 g/ml, aromatic hydrocarbon content: 17.5 vol %, saturated hydrocarbon content: 82.5 vol %, sulfur content: 13.3 ppm, benzothiophene content: 8.8 ppm, dibenzothiophene content: 4.5 ppm, nitrogen content: not more than 1 ppm. Particles of the following compounds were used as solid superacid catalysts: sulfated zirconia alumina (specific surface area: 162 m²/g, pore volume: 0.305 ml/g, mean pore diameter: 56.4 Å, zirconia: 59 wt %, alumina: 31 wt %, sulfur: 2.9 wt %); tungstated zirconia alumina (specific surface area: 101 m²/g, pore volume: 0.302 ml/g, mean pore diameter: 95.0 Å, zirconia: 53 wt %, alumina: 25 wt %, tungstic acid: 20 wt %); sulfated alumina (specific surface area: 300 m²/g, pore volume: 0.601 ml/g, mean pore diameter: 58.9 Å, sulfur content: 4.0 wt %); and sulfated tin oxide alumina (specific surface area: 177 m²/g, pore volume: 0.113 ml/g, mean pore diameter: 26.7 Å). The same experiment was carried out as a Comparative Example using activated alumina ("F-200" manufactured by Alcoa Inc., specific surface area: 350 m²/g).

TABLE 10

|  | Kind of catalyst or adsorbent | Sulfur content after desulfurization [wtppm] | Desulfurization ratio [%] |
|---|---|---|---|
| Example 11-1 | Sulfated zirconia | 2.6 | 80.5 |
| Example 11-2 | Tungstated zirconia | 3.8 | 71.4 |
| Example 11-3 | Sulfated alumina | 2.8 | 78.9 |
| Example 11-4 | Sulfated tin oxide | 2.6 | 80.5 |
| Comparative example 11-1 | Activated alumina | 11.3 | 15.0 |

Example 12

1.0 g of solid superacid catalyst was immersed in 4 g of the same kerosene as used in Example 11 at 10° C. for not less than 24 hours. The contents of sulfur compounds before and after immersion were analyzed by a combustion oxidation-ultraviolet fluorescence method. The same solid superacid catalysts as used in Example 11 were used.

TABLE 11

|  | Kind of catalyst or adsorbent | Sulfur content after desulfurization [wtppm] | Desulfurization ratio [%] |
|---|---|---|---|
| Example 12-1 | Sulfated zirconia | 0.9 | 93.4 |
| Example 12-2 | Tungstated zirconia | 0.1 | 99.2 |
| Example 12-3 | Sulfated alumina | 0.2 | 98.6 |
| Example 12-4 | Sulfated tin oxide | 0.3 | 98.0 |

Example 13

Types of sulfur compounds remaining in the kerosene desulfurized to a sulfur content of 0.3 ppm using tungstated zirconia were identified by a gas chromatography-inductively coupled plasma-mass spectrometry analyzer (GC-ICP-MS) manufactured by Agilent Technologies. The content of thiophenes and benzothiophenes was not more than 2 ppb being a detection limit, and major remaining sulfur compounds were dibenzothiophenes. Thus, the present invention was confirmed to be very effective for removing thiophenes and benzothiophenes.

Example 14

Figure 1:
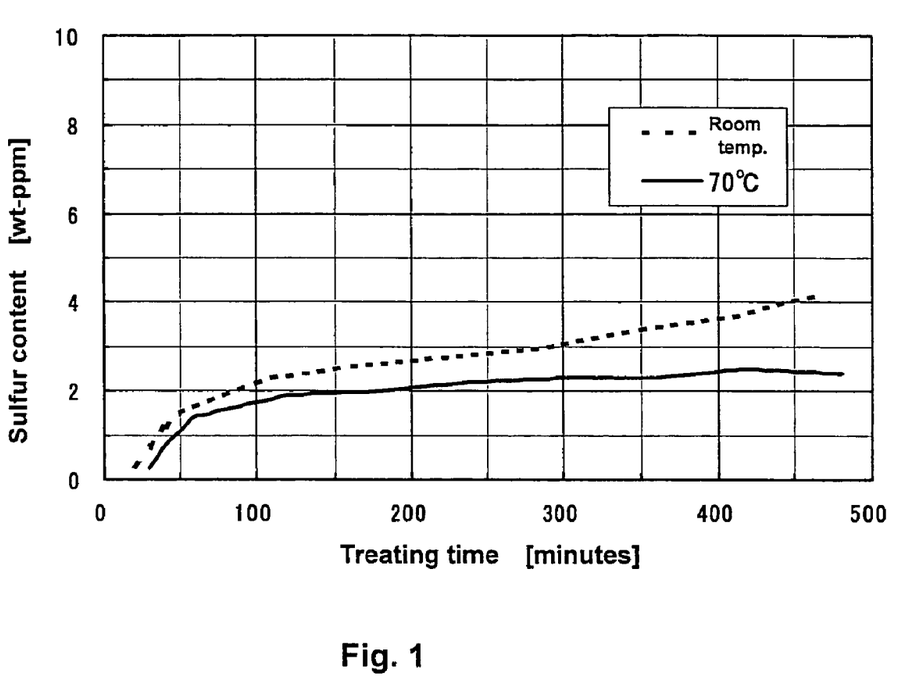
FIG. 1 is a graph showing the relationship of time on stream and the sulfur content in kerosene flowed out from a column loading with sulfated zirconia, when the kerosene was desulfurized by passing through the column.

25 g of sulfated zirconia was loaded in a column with a length of 300 mm and internal volume of 27 ml. The same kerosene as used in Example 11 was flowed through the column at a flow rate of 1 ml/min at room temperature and 70° C. to desulfurize. The relationship of time on stream and the sulfur content of kerosene flowed out from the column is shown in FIG. 1. It can be seen that sulfur was removed over a long period of time. Types of sulfur compounds remaining in the kerosene flowed out from the column were analyzed using a gas chromatography (GC)-sulfur chemiluminescence detector (SCD). As a result, benzothiophenes were not detected in all samples, and the remaining sulfur compounds were only dibenzothiophenes. Therefore, it was confirmed that the present invention is particularly effective for removing benzothiophenes.

INDUSTRIAL APPLICABILITY

According to the desulfurization method of the present invention, in which the solid acid catalyst and/or activated carbon containing a transition metal oxide are used, sulfur compounds in kerosene and gas oil, particularly sulfur compounds in aromatic hydrocarbon oils can be efficiently and economically removed by utilizing catalytic function and adsorptive function of the solid acid catalyst and activated carbon containing a transition metal oxide. Therefore, the method of the present invention can produce kerosene and gas oil with a particularly small sulfur content, as well as aromatic hydrocarbons such as benzene and naphthalene with a extremely small sulfur content, and provide these hydrocarbons as basic raw materials for various petrochemical products or intermediate materials.

The invention claimed is:

1. A method for desulfurizing kerosene or gas oil, consisting essentially of:
    reacting sulfur compounds in a kerosene or gas oil containing aromatic hydrocarbons and at least one sulfur compound selected from the group consisting of thiophene compounds, benzothiophene compounds, and dibenzothiophene compounds among themselves and/or with aromatic hydrocarbons by contacting the kerosene or gas oil with:
    a solid superacid catalyst selected from the group consisting of sulfated zirconia, sulfated alumina, sulfated tin oxide, sulfated iron oxide, tungstated zirconia, and tungstated tin oxide, and
    optionally a zeolite selected from the group consisting of proton-type faujasite zeolite, proton-type mordenite and proton-type β-zeolite, and having the silica/alumina ratio of 100 mol/mol or less and the content of cations other than proton of 5 mass % or less,
    wherein upon contacting the kerosene or gas oil with the solid superacid catalyst, the reaction between the sulfur compounds themselves or between the sulfur compounds and the aromatic hydrocarbons occurs prior to adsorption of the reaction products by the solid superacid catalyst.

2. The method according to claim 1, wherein the kerosene or gas oil is desulfurized to a content of the total sulfur compounds as sulfur of 1 ppm or less.

3. The method according to claim 1, wherein the solid superacid catalyst has a specific surface area of 100 m²/g or more.

4. The method according to claim 1, wherein the kerosene or gas oil contains aromatic hydrocarbons as major components.

5. The method according to claim 4, wherein the aromatic hydrocarbon is at least one hydrocarbon selected from the group consisting of benzene, alkylbenzene having 7-14 carbon atoms, naphthalene, and alkylnaphthalene having 11-18 carbon atoms.

6. The method according to claim 1, wherein the kerosene or gas oil is desulfurized in a fuel cell vehicle in which kerosene or gas oil is used as an on-board reforming fuel.

7. The method according to claim 1, wherein the sulfur compounds in the kerosene or gas oil and heavy sulfur compounds produced by the reaction among the sulfur compounds contained in the kerosene or gas oil and/or by the reaction of the sulfur compounds with aromatic hydrocarbons are adsorbed by the zeolite and the solid superacid catalyst.

8. The method according to claim 7, wherein the kerosene or gas oil is desulfurized to a content of the total sulfur compounds as sulfur of 1 ppm or less.

9. A method for desulfurizing kerosene or gas oil, comprising:
    reacting sulfur compounds in a kerosene or gas oil containing aromatic hydrocarbons and at least one sulfur compound selected from the group consisting of thiophene compounds, benzothiophene compounds, and dibenzothiophene compounds among themselves and/or with aromatic hydrocarbons by contacting the kerosene or gas oil into contact with:
    a solid superacid catalyst selected from the group consisting of sulfated zirconia, sulfated alumina, sulfated tin oxide, sulfated iron oxide, tungstated zirconia, and tungstated tin oxide, and
    a zeolite selected from the group consisting of proton-type faujasite zeolite, proton-type mordenite and proton-type β-zeolite, and having the silica/alumina ratio of 100 mol/mol or less and the content of cations other than proton of 5 mass % or less,
    wherein upon contacting the kerosene or gas oil with the solid superacid catalyst, the reaction between the sulfur compounds themselves or between the sulfur compounds and the aromatic hydrocarbons occurs prior to adsorption of the reaction products by the solid superacid catalyst.

10. The method according to claim 9, wherein the sulfur compounds in the kerosene or gas oil and heavy sulfur compounds produced by the reaction among the sulfur compounds contained in the kerosene or gas oil and/or by the reaction of the sulfur compounds with aromatic hydrocarbons are adsorbed by the zeolite and the solid superacid catalyst.

11. The method according to claim 10, wherein the kerosene or gas oil is desulfurized to a content of the total sulfur compounds as sulfur of 1 ppm or less.

12. The method according to claim 9, wherein the kerosene or gas oil is desulfurized to a content of the total sulfur compounds as sulfur of 1 ppm or less.

13. The method according to claim 9, wherein the solid superacid catalyst has a specific surface area of 100 m²/g or more.

14. The method according to claim 9, wherein the kerosene or gas oil contains aromatic hydrocarbons as major components.

15. The method according to claim 14, wherein the aromatic hydrocarbon is at least one hydrocarbon selected from the group consisting of benzene, alkylbenzene having 7-14 carbon atoms, naphthalene, and alkylnaphthalene having 11-18 carbon atoms.

16. The method according to claim 9, wherein the kerosene or gas oil is desulfurized in a fuel cell vehicle in which kerosene or gas oil is used as an on-board reforming fuel.

* * * * *